United States Patent [19]

Sodeikat

[11] Patent Number: 4,672,205
[45] Date of Patent: Jun. 9, 1987

[54] METHOD OF PROCESSING THE OUTPUT SIGNALS OF AN OPTICAL EARTH-HORIZON SENSOR

[75] Inventor: Dieter Sodeikat, Baierbrunn, Fed. Rep. of Germany

[73] Assignee: Messerschmitt-Bölkow-Blohm Gesellschaft mit beschränkter Haftung, Munich, Fed. Rep. of Germany

[21] Appl. No.: 745,020

[22] Filed: Jun. 13, 1985

[51] Int. Cl.⁴ .............................................. G01J 1/34
[52] U.S. Cl. .................................... 250/338; 250/342; 250/347; 250/351
[58] Field of Search ............... 250/338, 349, 347, 342, 250/352, 351; 364/434, 459

[56] References Cited

U.S. PATENT DOCUMENTS

| | | | |
|---|---|---|---|
| 3,486,024 | 12/1969 | Astheimer | 250/338 |
| 3,551,681 | 12/1970 | Astheimer | 250/349 |
| 3,714,432 | 1/1973 | Jalink, Jr. | 250/340 |
| 3,920,994 | 11/1975 | Cargille | 250/347 |

FOREIGN PATENT DOCUMENTS

P33227500 1/1985 Fed. Rep. of Germany ...... 250/338

Primary Examiner—Craig E. Church
Assistant Examiner—Richard Hanig
Attorney, Agent, or Firm—Toren, McGeady and Goldberg

[57] ABSTRACT

The invention is directed to a method for determining the anomaly portion in the output signal of a zero-seeking earth-horizon sensor for a geostationary satellite. The horizon sensor comprises a chopper disk operated with constant frequency, which chopper disk pictures the image of oppositely located earth horizons on a common infrared detector. When the thermal radiation of the two earth horizons is different the anomaly portion contained in the detector output signal can be determined in that the off-course signals are measured for different amplitudes of the chopper disk. Since the anomaly-dependent portion in the detector output signal depends on this chopper amplitude, correcting amounts can be determined for the measured values corresponding to the anomaly portion.

3 Claims, 12 Drawing Figures

METHOD OF PROCESSING THE OUTPUT SIGNALS OF AN OPTICAL EARTH-HORIZON SENSOR

BACKGROUND OF THE INVENTION

1. Field of the Invention

The invention is directed to a method for processing the output signal of an optical earth-horizon sensor of a geostationary satellite wherein the earth-horizon sensor includes a input lens, a chopper disk which is located in the image plane of the input lens and is reciprocated with a determined amplitude (chopper amplitude) and frequency (chopper frequency) and has a diameter corresponding approximately to the image of the earth, a secondry lens and a detector, the output signal of the earth-horizon sensor being amplified and demodulated to a sensor off-course signal with the chopper frequency, the sensor off-course signal being a measurement for the off-course angle of the line of sight of the earth-horizon sensor in relation to the satellite/earth central point connecting line.

2. Description of Related Art

Control signals which indicate the deviation of a line of sight, which is fixed with respect to the satellite, in relation to the satellite-earth central point connecting line, are required for attitude control of geostationary satellites. For this purpose, optical earth-horizon sensors are used, among others, for two axes, which earth-horizon sensors can be classed with the zero-seeking sensors. Such an earth-horizon sensor works in the infrared range and is based on the mechanical vibrator or chopper principle. The infrared radiation of the earth is collected by means of an objective lens of germanium and falls on a circular chopper disk in the image plane of the lens. This chopper disk has a diameter approximately corresponding to the image of the earth and is reciprocated with a determined amplitude, the chopper amplitude, at a determined frequency, the chopper frequency. The light of the two oppositely located earth horizons alternately released with the chopper frequency, which light falls through the collecting lens and is interrupted by the chopper disk, is directed on a detector, e.g. a pyroelectric detector, via a secondary lens composed of a spherical mirror segment and a prism via a spectral filter for the infrared range. The output signal of the detector is amplified and subsequently demodulated with the chopper frequency. If the light energy received by the detector from the two earth horizons is identical, a ZERO signal is supplied by means of the demodulation. If this is not the case, e.g. because the line of sight of the earth-horizon sensor does not coincide with the satellite-earth central point connecting line, then the output signal of the detector depends on the difference of the received light quantities of the two horizons. This difference is a measurement of the off-course angle of the line of sight of the earth-horizon sensor in relation to the satellite-earth central point connecting line.

With such an earth-horizon sensor, the off-course angle can be indicated in one axis. Two such earth-horizon sensors are required for triaxial stabilization.

The chopper disk is reciprocated by approximately 1 mm with a chopper frequency of approximately 40 Hz and an amplitude of approximately 1/17 of the disk diameter.

Such earth-horizon sensors based on the chopper principle have several advantages compared with other sensor systems:

Firstly, the mechanical vibrator or chopper is a very simple spring-mass system which oscillates with its natural resonant frequency. Therefore, neither a drive motor nor a costly angle selection is required. Secondly, the interrupted infrared radiation is guided to only one detector per channel, thereby eliminating the problem of alignment of a plurality of detectors and the problem of weakening.

The measuring range of such an earth-horizon sensor is approximately $\pm 1°$. The above-mentioned zero point error as a result of varying radiation of opposite earth horizons is only slight, but in extreme cases can amount to approximately $\pm 16\%$ of the indicated measuring range of a degree. An effort is made to keep this error signal produced by means of the radiation anomaly, i.e. the anomaly portion within the sensor off-course signal, as small as possible. This effort is understandable when it is taken into consideration that geostationary satellites are to be used for producing directional radio links and guided television links with the earth.

SUMMARY OF THE INVENTION

The invention has the object of providing a method for correcting the anomaly portion within the sensor off-course signals which can be derived in a simple manner from the sensor off-course signals themselves.

This object is met, according to the invention, by the earth horizon sensor being operated with different chopper amplitudes, the respective off-course signals being compared for the chopper amplitudes with the values of the standard characteristic lines for chopper amplitude without the anomaly in a common off-course angle, when the values for a common off-course angle do not coincide, the measured values being corrected until an overlapping of the corresponding values occurs, and the measured values being reduced by the amounts of this correction (anomaly portion).

The invention proceeds from the discovery that the anomaly portion of the sensor off-course signal depends only on the anomaly V and the chopper amplitude A so that when the chopper amplitude A is changed to a value A1, the anomaly portion $U_{DA}$ also changes in proportion to the amplitude from $U_{DA}$ to $U_{DA1}$. Accordingly, in a change of the chopper amplitude and the change of the anomaly portion following from the latter, the earth anomaly and also the anomaly portion of the sensor off-course signal can be derived directly. This is explained in the following:

With a uniformly warm earth, the two earth horizons or earth rims radiate the same energy, i.e.

$$E_L = E_R = E \tag{1}$$

Here, E is the mean radiation energy, $E_L$ is the radiation energy of the left earth rim and $E_R$ is the radiation energy of the right earth rim. If the radiation energies of the left and right earth rims are not equal, i.e. if $E_L \neq E_R$, then this state is designated an earth anomaly.

For further considerations it is assumed that the mean energy is constant, i.e. that $$E_L + E_R = 2E = \text{constant} \tag{2}$$

The different radiation energy of the two earth rims is represented by $$E_L = E - \Delta_{E_R} = E + \Delta \quad (3)$$

Here, $\Delta$ is the energy difference of the radiation energy in relation to the mean value. The ratio of these two radiation energies is designated as earth anomaly V:

$$V = \frac{E_L}{E_R} = \frac{E(1-\Delta)}{E(1+\Delta)} = \frac{1-\Delta}{1+\Delta} \text{ and } \Delta = \frac{1-V}{1+V} \quad (4)$$

In practice the anomaly V fluctuates in an area between 1.5/1 to 1/1.5.

If there is no earth anomaly, the characteristic line of the earth-horizon sensor can be approximately shown by means of the following formula (cf. FIG. 1)

$$U_{D\alpha} = \frac{2}{\pi} \cdot K \cdot A \cdot \text{sine}\left(\alpha \cdot \frac{K_A}{A} \cdot 90\right) \quad (5)$$

The formula is applicable for the range $$-1 \leq \alpha \cdot \frac{K_A}{A} \leq +1$$

In the formula:
- $U_{D\alpha}$ = the sensor off-course signal which is dependent on the off-course angle $\alpha$ and is measured as electrical current;
- K = a constant proportionality factor which is determined by means of the sensor geometry;
- A = chopper amplitude;
- $\alpha$ = off-course angle of the line of sight of the earth-horizon sensor;
- $K_A$ = a mechanical, likewise constant transmission factor.

FIG. 1 shows the curve of the characteristic line $U_{D\alpha}$. The entire characteristic line extends over an angle area of approximately $\pm 18°$, the measuring range used for the sensor off-course angle is approximately $\pm 1°$. The curve of the characteristic line in this indicated measuring range is shown in FIG. 2. It can be seen from this figure that the characteristic line can be linearized for small off-course angles, specifically by means of the following formula:

$$U_{D\alpha}{}^x = K \cdot K_A \cdot \alpha \quad (6)$$

This linearized characteristic line $U_{D\alpha}{}^x$ is shown in FIG. 2 in a dashed line.

If the two earth rims radiate different energies then the entire characteristic line $U_D$ is composed of the above uninterrupted characteristic line $U_{D\alpha}$ and an anomaly portion $U_{DA}$:

$$U_D = U_{DA} + U_{D\alpha} \quad (7)$$

The anomaly portion $U_{DA}$ is then $$U_{DA} = K \cdot A \cdot \frac{1-V}{1+V} \quad (8)$$

On the basis of formulas 5, 7 and 8, then, there follows for the characteristic line $U_D$ of the earth-horizon sensor $$U_D = K \cdot A \cdot \frac{1-V}{1+V} + \frac{2}{\pi} \cdot K \cdot A \cdot \text{sine}\left(\alpha \frac{K_A}{A} \cdot 90\right) \quad (9)$$

$$\text{for } -1 \leq \alpha \frac{K_A}{A} \leq +1$$

or for small values $\alpha$ $$U_D{}^x = K \cdot A \cdot \frac{1-V}{1+V} + K \cdot K_A \cdot \alpha \quad (10)$$

It follows from formulas 8 to 10 that, as indicated above, the anomaly portion of the sensor off-course signal depends only on the anomaly V and the chopper amplitude A.

If the sensor off-course signal is now measured at two different chopper amplitudes A and A1, the anomaly portion $U_{DA}$ will be independent of the anomaly V at least for small angles. For small angles $$U_{DA} = \frac{A}{A - A_1}(U_D - U_{D1}) \quad (11)$$

applies for the anomaly portion and $$U^x_{D\alpha} = U_D - \frac{A}{A - A_1}(U_D - U_{D1}) \quad (12)$$

applies for the characteristic line $U_{D\alpha}{}^x$ which is simplified, corrected and true for small off-course angles $\alpha$, For the earth anomaly V there follows $$V = \frac{(A - A_1) \cdot K - (U_D - U_{D1})}{(A - A_1) \cdot K + (U_D - U_{D1})} \quad (13)$$

from which it follows that the earth anomaly depends only on the chopper amplitude and the sensor off-course signals at the different chopper amplitudes. Of course, for large off-course angles, the complete formula for the characteristic line must be made use of.

Accordingly, inferences can be drawn for a corrected sensor characteristic line, in which the earth anomaly is taken into consideration, solely from the values of the sensor off-course signals for different chopper amplitudes.

The correction of the characteristic line is explained graphically in FIGS. 3 and 4.

Two characteristic lines $U_{D\alpha}$ and $U_{D1\alpha}$ without anomaly are plotted in FIG. 3, wherein one characteristic line $U_{D\alpha}$ is applicable for amplitude A, and the other characteristic line is applicable for amplitude $A_1$. Two characteristic lines $U_D$ and $U_{D1}$ are also plotted which are applicable for an anomaly of $V = 1.5/1$ and are assigned to amplitudes A and $A_1$, respectively.

In a first instance, the two voltage values U and $U_1$ are measured for the chopper amplitude A and $A_1$, respectively. As follows from FIG. 4, the off-course angles indicated with crosses on the two standard characteristic lines without anomaly would correspond to these voltage values.

In a second instance, the voltage values U' and $U_1'$, respectively, are measured for the amplitude A and $A_1$, respectively; these values are also shown with crosses on the two standard characteristic lines $U_D$ and $U_{D1\alpha}$, respectively. The first values on the standard characteristic line corresponding to the voltage values U and $U_1$ are still located in the area in which the two standard characteristic lines overlap, whereas the values for U' and $U_1'$ are no longer located in the overlapping area. Since the respective measuring values cannot be assigned to the same off-course angle on the standard characteristic lines, anomaly is present. In the linear area of the characteristic line the anomaly voltage $U_{DA}$ can be calculated directly from equation (11). The anomaly signal corresponding to the earth anomaly V then follows from the equation (13). For values U' and $U_1'$ the complete shapes or curve shapes of the individual characteristic lines must be taken into consideration. In all cases, the calculation operations can be interpreted in such a way that the corresponding characteristic lines without and with anomaly are shifted together in a common zero point and overlap in pairs. The individual anomaly portions $U_{DA}$ and $U_{DA1}$ then result by means of the displacement of the individual characteristic lines. Since the lens of the earth-horizon sensor brings about further non-linear distortions of the characteristic line and of the transmission function of the horizon sensor, respectively, the correction for large off-course angles is not derived from the mathematically given characteristic line, but, rather, from the actually measured curve. But nothing changes in terms of the principle of the correction.

Various possibilities are conceivable for realizing the above-indicated method for correcting the sensor off-course signals. For example, the chopper disk can be moved intermittently with various amplitudes. Of course, by means of switching over the chopper amplitude, the measuring process is interrupted so that no continuous measurement is possible.

For the purpose of correcting the anomaly, the sensor off-course signals of two separate earth-horizon sensors can also be made use of. The lens can then either be constructed so as to be doubled, or can be made common to both chopper disks by means of a beam splitter.

An amplitude modulation of the chopper amplitude and the evaluation of the sensor off-course signal of the respective chopper amplitude by means of a synchronous demodulator is particularly advantageous. In this case, the anomaly signal and the correction of the angular deviation are produced directly. If the modulation frequency is higher than the bandwidth of the sensor off-course signal, the amplitude modulation of the sensor off-course signal can be suppressed. A continuous measurement of the signal for the angular deviation and the anomaly is possible in this case. By means of using the amplitude modulation, a completely autonomous correction of the earth-horizon sensor internal to the sensor is possible. The output signals which the earth-horizon sensor gives to the computer for the attitude control of the geostationary satellite are accordingly already corrected and need not be corrected further in the computer.

BRIEF DESCRIPTION OF THE DRAWINGS

Other advantages and constructions of the invention will become apparent in the following description in which the invention is explained in more detail with the aid of the drawings. Shown in the drawings are.

DESCRIPTION OF THE PREFERRED EMBODIMENTS

Figure 11:
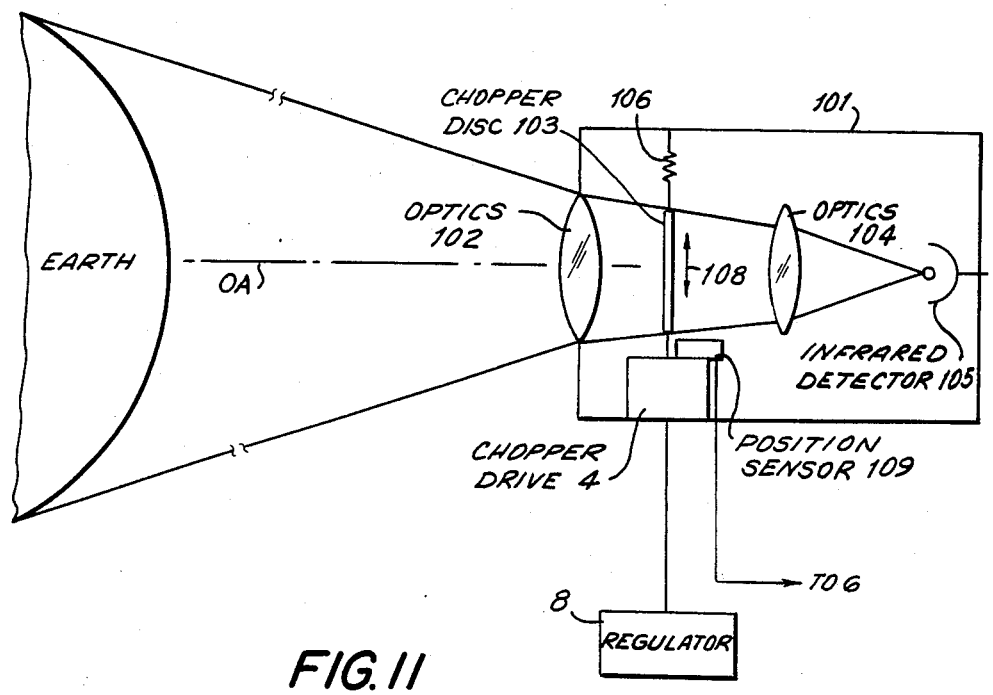
FIG. 11 a functional block diagram of an optical earth horizon sensor.

FIG. 11 shows an optical earth horizon sensor having a housing 101 with input optics 102, a chopper disk 103, intermediate optics 104 and an infrared detector 105. In case of a correct attitude of the earth satellite, the optical axis OA of the sensor is oriented towards the center of the earth. Radiation beam emanating from the earth and its surroundings are received by the input optics 102 and ordinarily would be concentrated onto the infrared detector 105 by the intermediate optics 104. However, the opaque chopper disk 103 is arranged in the path of the beams between the input optics 102 and the intermediate optics 104 in such a way that in its shown neutral position symmetrically with the optical axis OA, the image of the earth is exactly covered so that no radiation falls on the detector 105.

The chopper disk 103 is connected with the housing 101 by a spring 106 and is periodically reciprocated in its plane by a chopper drive 4, this reciprocating motion being indicated by the double arrow 108. The chopper disk 103 in its entirety is a spring-mass system oscillating with its natural frequency, so that only a small amount of energy is required for the periodic drive. When the chopper disk 103 moves towards the top of the Figure, then the radiation from the bottom rim of the earth now falls through the optics 102, 104 on the detector 105, so that it receives a signal. The maximum amplitude A of the chopper disk is small and lies within a range of about 1 mm. After reversing of the motion, the chopper disk moves toward the bottom through the neutral position shown, in which the output current of the detector 105 is again equal to zero. Subsequently, the radiation from the top earth rim falls through the optics 102, 104 upon the detector 105, so that it again puts out a signal. The course of this signal is, as easily seen, a sine curve.

This sine curve signal is synchronously demodulated after being amplified, the portions lying above and below the zero line of the sine curve signal being evaluated against each other. If the satellite is in the correct attitude as shown in FIG. 11, so that the optical axis OA is oriented towards the center of the earth, then the positive and negative portions of the sine curve signal are equal, so that after the synchronous demodulation, a zero signal results. If the satellite, however, is not correctly aligned, then the sine curve signal is not symmetrical to the zero line, wherein the radiation of one of the two earth rims is lrger than the radiation emanating, respectively, from the other earth rim. Because of the evaluation of the portions of the sine curve signal lying above and below the zero line, there appears upon the synchronous demodulation, a positive or negative signal depending on the erroneous alignment of the optical axis OA in direction of one of the earth rims. The usual error deviations measured with this type sensor lies within the range of ±1°.

This analysis is only correct if no earth anomaly exists, meaning when earth rims have the same temperature, so that the radiation received from both earth rims is of equal intensity if the attitude of the earth satellite is correct.

Earth anomaly can be corrected with the subject invention by varying the chopper amplitude A. As can be discerned from the equations 7 et seq., the anomaly portion of the off-course signal is a function of only the anomaly and the chopper amplitude A. If now the off-course signal is measured at two different chopper amplitudes A and A1, as can be seen from equation (11), the anomaly portions, at least for small angles, becomes independent of the anomaly. This also applies indeed for a larger angular range; however, the general equation (14), to be described later, must then be used.

Figure 12:
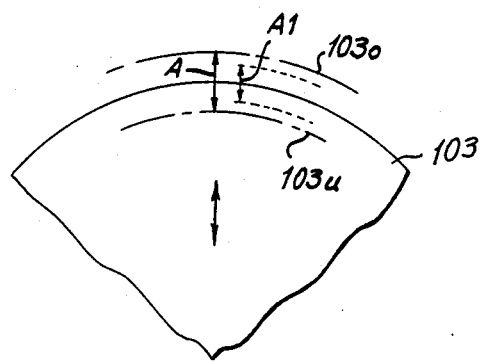
FIG. 12 a plan view of a section of the chopper disk.

The motion of the chopper disk 103 is illustrated schematically in FIG. 12. For the amplitude A, the edge of the chopper disk 103 in the upper position is designated as 103o, and in the lower position as 103u. Correspondingly, the upper ad lower extreme attitudes of the chopper disk 103 is shown in dotted lines.

A position sensor 109 is additionally provided in the housing 101 of the earth horizon sensor, with which the respective positions of the chopper disk 103, and accordingly also its amplitudes, can be measured. The output signal of this position sensor 109 leads to the block 6 (shown in FIGS. 7 to 10). This signal serves as a feedback signal for the regulator 8 of the chopper drive 4.

In the block schematic diagrams in FIGS. 7 to 10 the same reference numerals are used for identical or identically acting structural component parts, but with the letters a, b, c or d added to them.

Figure 7:
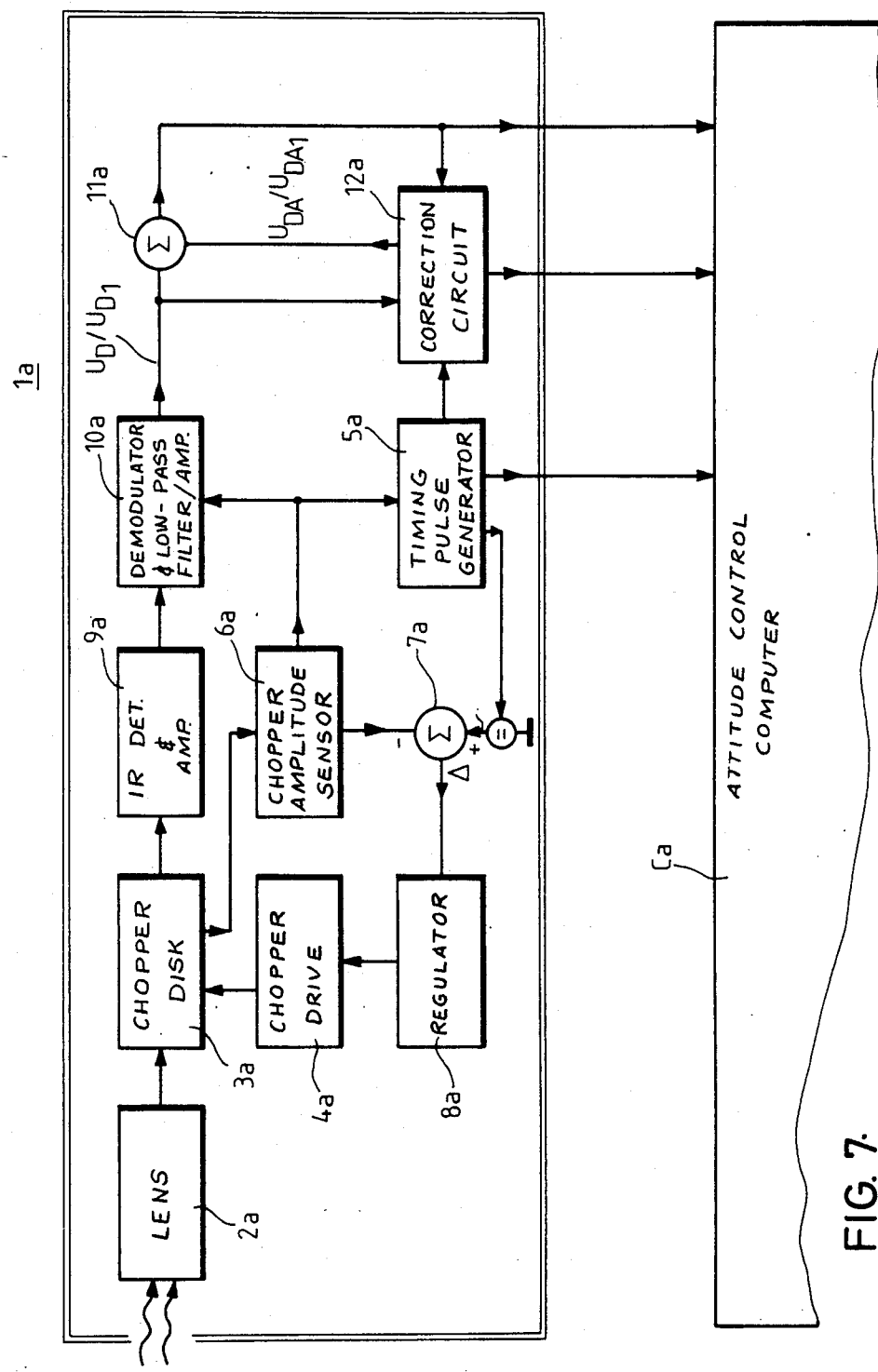
FIGS. 7 to 10 block schematic diagrams for each different embodiment form of the earth sensors.

In FIG. 7, the optical earth-horizon sensor 1a has an input lens 2a which is sensitive for the infrared range. A chopper disk 3a is arranged in the focal plane of the lens 2a, which chopper disk 3a is driven by means of a chopper drive 4a, e.g. a resonating magnet-spring system. The chopper disk 3a is driven so as to be controlled with a constant frequency of, e.g., 40 Hz with a determined chopper amplitude. The chopper amplitude is switched over in a predetermined rhythm between two different amplitudes A and A1. This timed switching-over is controlled by means of a timing pulse generator 5a, as are all of the other evaluations. The chopper amplitude is measured here with a sensor 6a, not described in more detail, the actual value is given to a summing point 7a at whose other input is located the desired value. The off-course signal, and a timing signal, is fed to a controlling means 8a which correspondingly regulates the chopper drive. The chopper frequency is fed to the timing pulse generator 5a as a synchronization signal, which timing pulse generator 5a also carries out the alignment of the other participating circuit arrangements, particularly the alignment with a computer Ca for the attitude control.

The infrared radiation, which is periodically let through by the chopper 3a falls on an infrared detector; the output signal is amplified. This is indicated by block 9a. The amplified detector signal is fed in a timed manner to a demodulator with low-pass filter and amplifier 10a. A timed series of voltage values $U_D$ and $U_{D1}$, respectively, which correspond to the sensor off-course signals with the two amplitudes A and A1, respectively, then appears at the output of the demodulator 10a. These off-course signals, which are determined in series, are fed, on the one hand, to a summing member 11a and, on the other hand, to a correcting circuit 12a in which anomaly errors are corrected. This correction is effected, as explained above, according to the off-course angle, with the aid of pregiven equations or by means of a more or less complicated mathematical or graphic comparison of individual characteristic lines. The anomaly portions $U_{DA}$ and $U_{DA1}$, as well as the anomaly signal V, are calculated in the correction circuit 12a. The anomaly portion is fed in phase to the summing member 11a and is there combined with the output signal $U_D$ and $U_{D1}$, respectively, of the demodulator 10a. The anomaly-corrected off-course signal of the line of sight of the earth-horizon sensor 1a then appears at the output of the summing member 11a.

The corrected off-course signal, the anomaly signal and the alignment and timing signal from the timing pulse generator 5a are then fed to the computer Ca for the attitude control of the satellite.

In the described embodiment, the amplitude control and the anomaly correction can also be effected in the computer Ca for the attitude control; the computer need only select the measuring and alignment timing over the amplitude timing.

Figure 8:
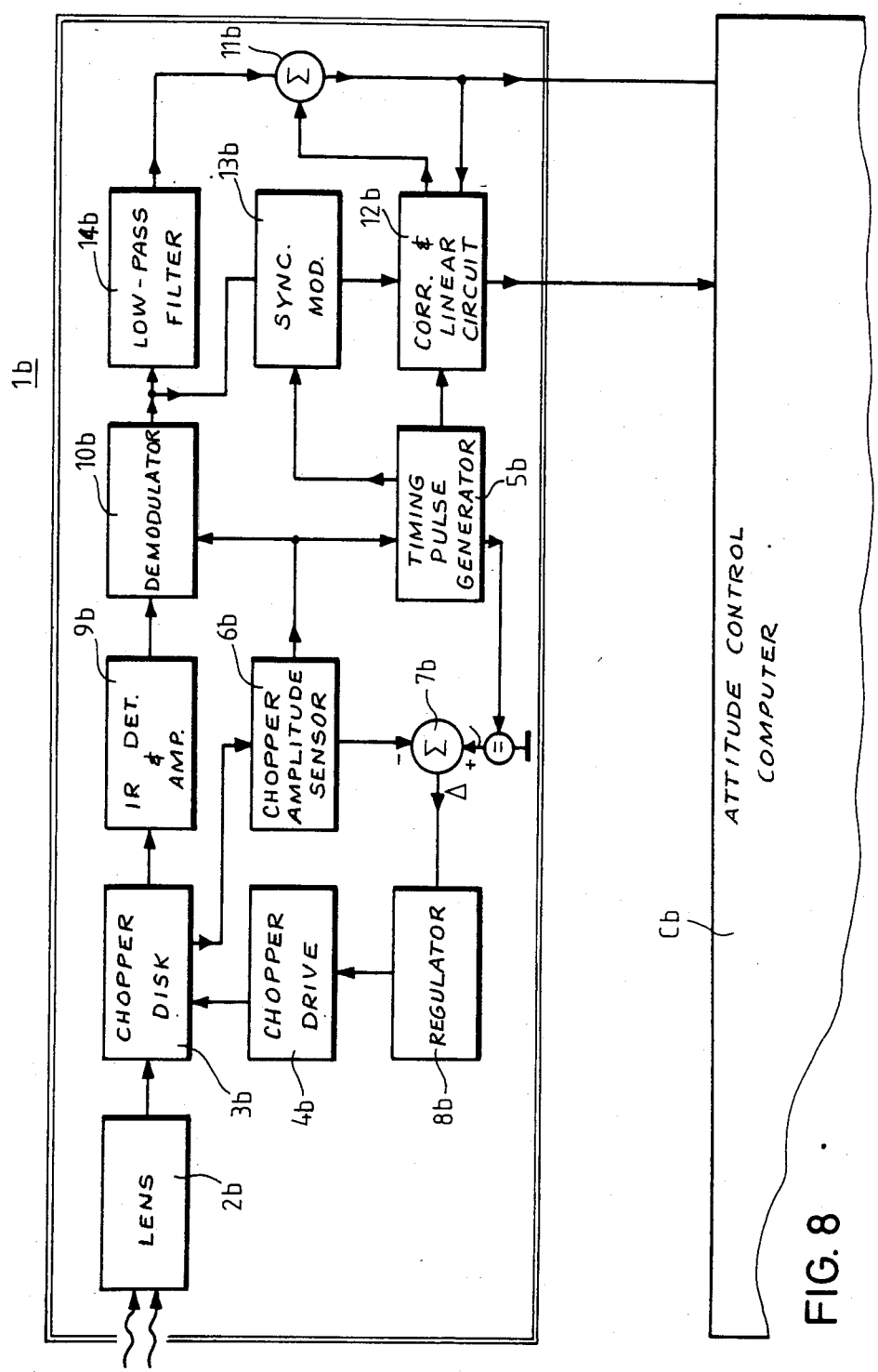

FIG. 8 shows an earth-horizon sensor 1b in which the evaluation of the off-course signal belonging to the chopper amplitude is effected by means of a synchronous modulator 13b. With the aid of a timing pulse generator 5b for the amplitude modulation, the chopper amplitude is modulated with a frequency which is higher than the bandwidth of the off-course signal. The output signal of the detector 9b is fed to a demodulator 10b whose output signal can generally be represented by:

$$U_{Dm} = K \frac{1-V}{1+V} \cdot A_m + \frac{1}{T} \cdot K \cdot A_m \cdot \left[ (1+m) \text{ sine} \left( \alpha \frac{K_A}{A_m} \cdot \frac{90}{1+m} \right) \text{ sine} \left( \alpha \frac{K_A}{A_m} \cdot \frac{90}{1-m} \right) \right] \quad (14)$$

$$\underbrace{\phantom{K \frac{1-V}{1+V} \cdot A_m}}_{U_{DmA}} \quad \underbrace{\phantom{\frac{1}{T} \cdot K \cdot A_m \cdot \left[ (1+m) \text{ sine} \right]}}_{U_{Dma}}$$

wherein T is the period of the pulse generator 5b and m is the degree of modulation of the amplitude modulation.

The first term $U_{DmA}$ designates the mean value of the anomaly portion, while the second term $U_{Dma}$ designates the part of the sensor off-course signal which is dependent on the off-course angle. For small off-course angles, the anomaly signal V can be calculated from $$\boxed{U_{Dm}{}^x = K \frac{1-V}{1+V} \cdot A_m + K \cdot K_A \cdot \alpha} \quad (15)$$

$$V = \frac{(A_{max} - A_{min}) \cdot K - (U_{max} - U_{min})}{(A_{max} - A_{min}) \cdot K + (U_{max} - U_{min})}$$

$$V = \frac{A_m \cdot 2m \cdot K - (U_{max} - U_{min})}{A_m \cdot 2m \cdot K + (U_{max} - U_{min})}$$

In this case, $A_{max}$ and $A_{min}$ are the maximum and minimum chopper amplitudes, respectively, $U_{max}$ and $U_{min}$ are the off-course voltages at maximum amplitude and at minimum amplitude, respectively, and K is the proportionality factor of the horizon sensor mentioned above.

Figure 1:
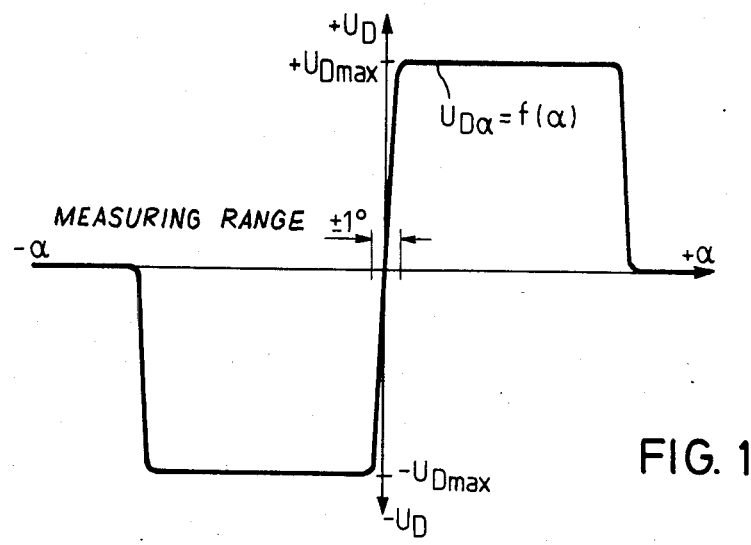
FIG. 1 the curve of the characteristic line of an earth-horizon sensor without anomaly along the entire collecting area.
Figure 2:
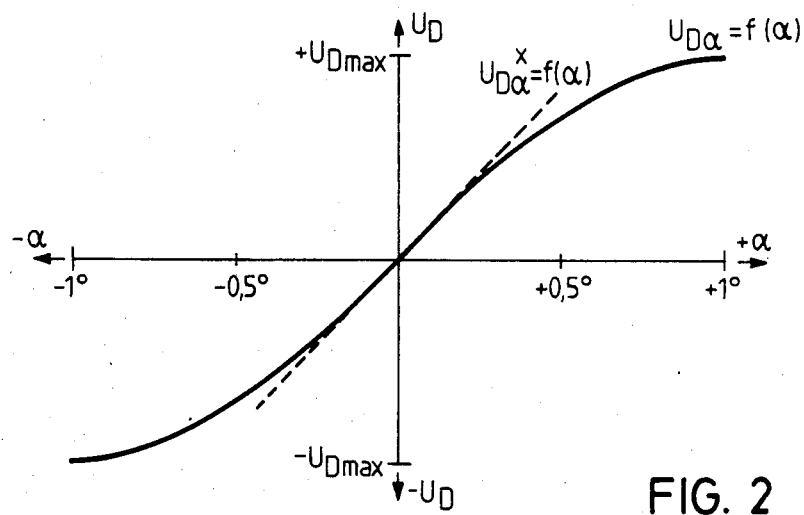
FIG. 2 the curve of the characteristic line of an earth-horizon sensor without anomaly for off-course angles between ±1°.
Figure 3:
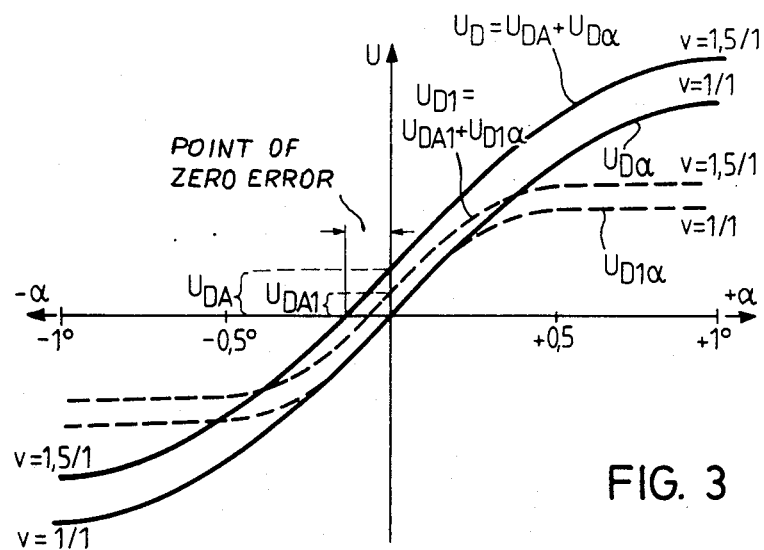
FIG. 3 the curve of two characteristic lines without anomaly for two different chopper amplitudes and the curve of these characteristic lines with anomaly, FIG. 4 a section from FIG. 3 in enlarged scale, FIG. 5 the curve of different characteristic lines of the earth-horizon sensor with an amplitude modulation of the chopper amplitude.
Figure 4:
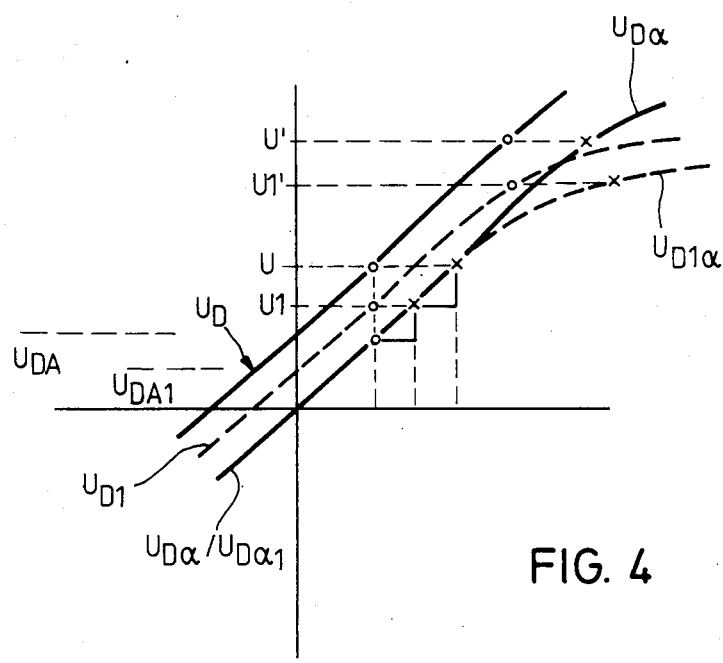
Figure 5:
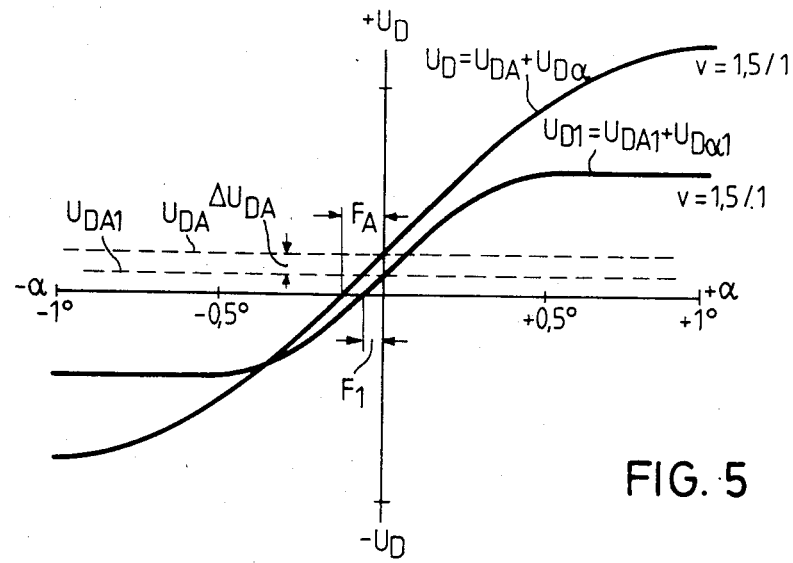
Figure 6:
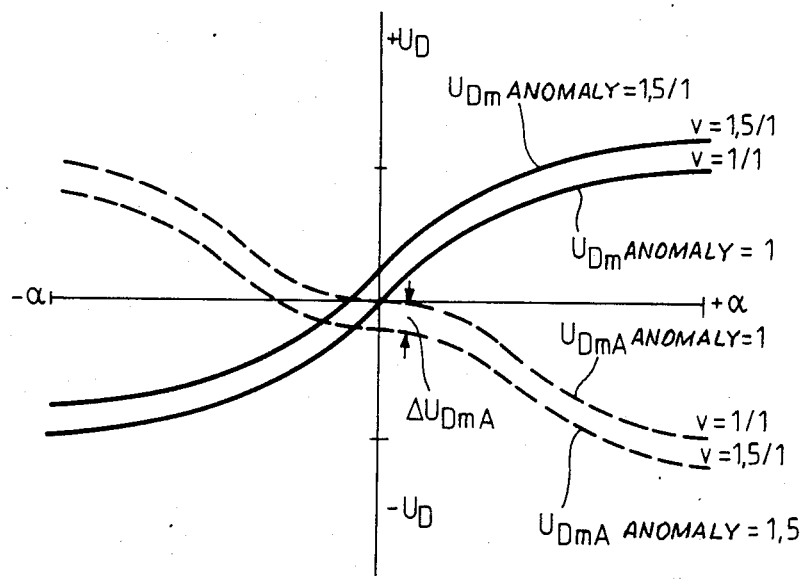
FIG. 6 the curve of the characteristic lines for a mean value of the anomaly portion of the sensor off-course signal with an amplitude modulation of the amplitude of the chopper disk.

As can be seen from the equation (14), the demodulator signal is composed of an anomaly-dependent part and a position-dependent part. In the above embodiment, with two fixed amplitudes A and $A_1$, the error caused by the anomaly was expressed by a fixed amount. In an amplitude modulation according to the embodiment of FIG. 9, the anomaly portion is likewise modulated. This portion is demodulated in the demodulator 13b; next, the anomaly-dependent portion and the anomaly itself are determined in the correction and linearization circuit 12b. The output signal of the demodulator 10b is fed to the summing member 11b via a low-pass filter 14b. The summing member 11b further obtains the mean value of the anomaly portion from the correction circuit 12b. The output of the summing member 11b is then the corrected sensor off-course signal. This signal and the anomaly signal V are fed to the computer Cb for the attitude control of the satellite. The curve of the mean value of the anomaly portion $U_{DmA}$ for anomaly values of $V=1/1$ and $V=1.5/1$ is shown in FIG. 6. Also plotted are the characteristic lines $U_{Dm}$ for the mean off-course voltage for the same anomaly values 1 and 1.5, respectively.

For the purpose of correcting the anomaly, the signal trains of two independent earth-horizon sensors can also be used for a measuring axis. In such a double-channel sensor, the two sensors can either oscillate with different chopper amplitudes, one of the sensors at a constant amplitude and the second sensor oscillating with changing amplitude, or both sensors can change their amplitude. The evaluation of the off-course signal of the two channels can, in turn, be carried out either externally by the computer or internally in the sensor itself, or in a combination of the two possibilities.

If the two sensors oscillate with different chopper amplitudes, the off-course signal and anomaly signal can be detected simultaneously, and the off-course angle also can accordingly be corrected without delay. The disadvantage here is the different drift behavior of the two independent sensor channels. If one of the sensors is operated with constant amplitude and the other with variable amplitude, then the charactefistic line of the-channel for the second sensor can be adapted to that of the first channel. The disadvantage, as in the first embodiment, is the timed correction of the anomaly.

Figure 9:
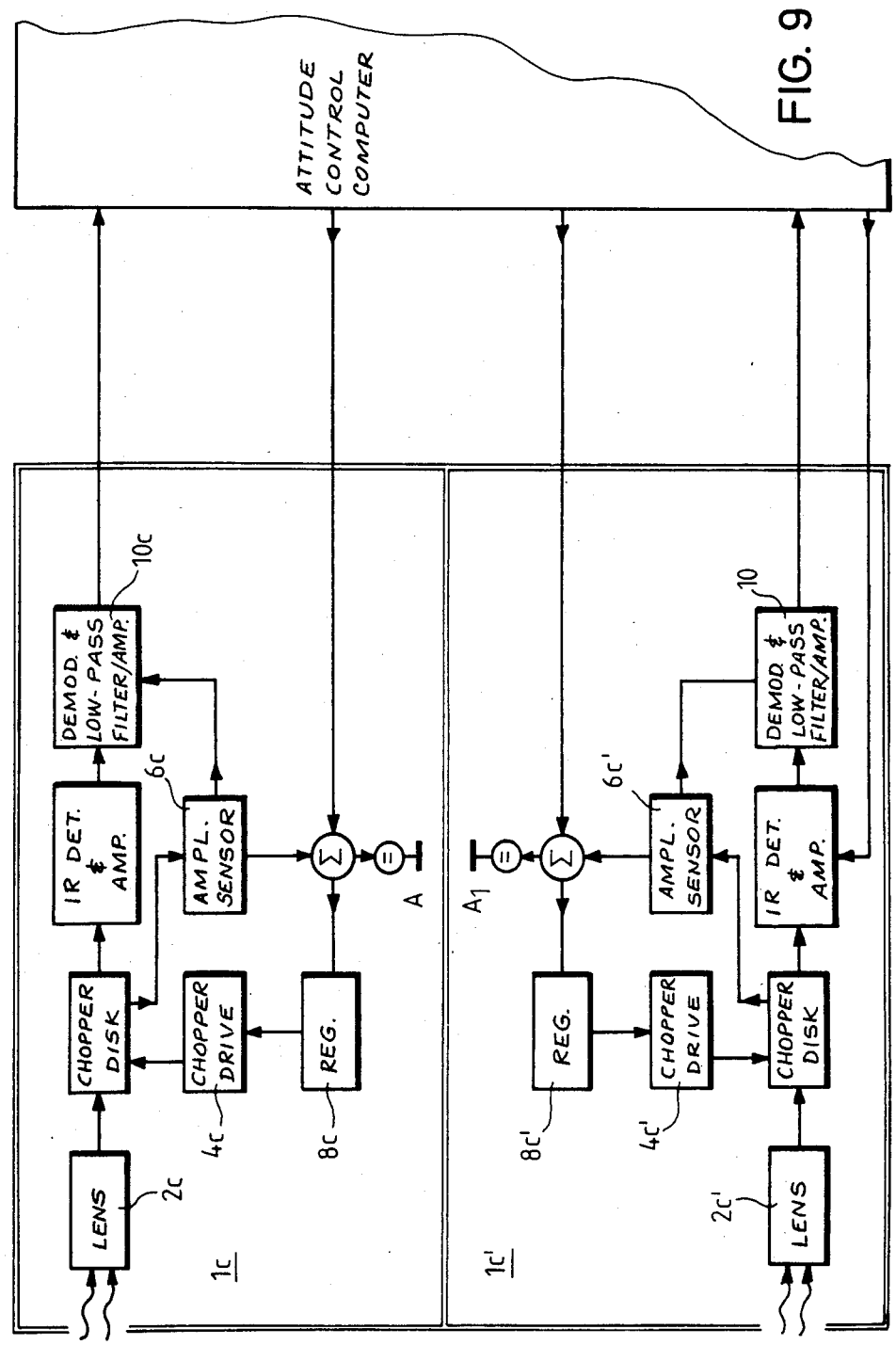
Figure 10:
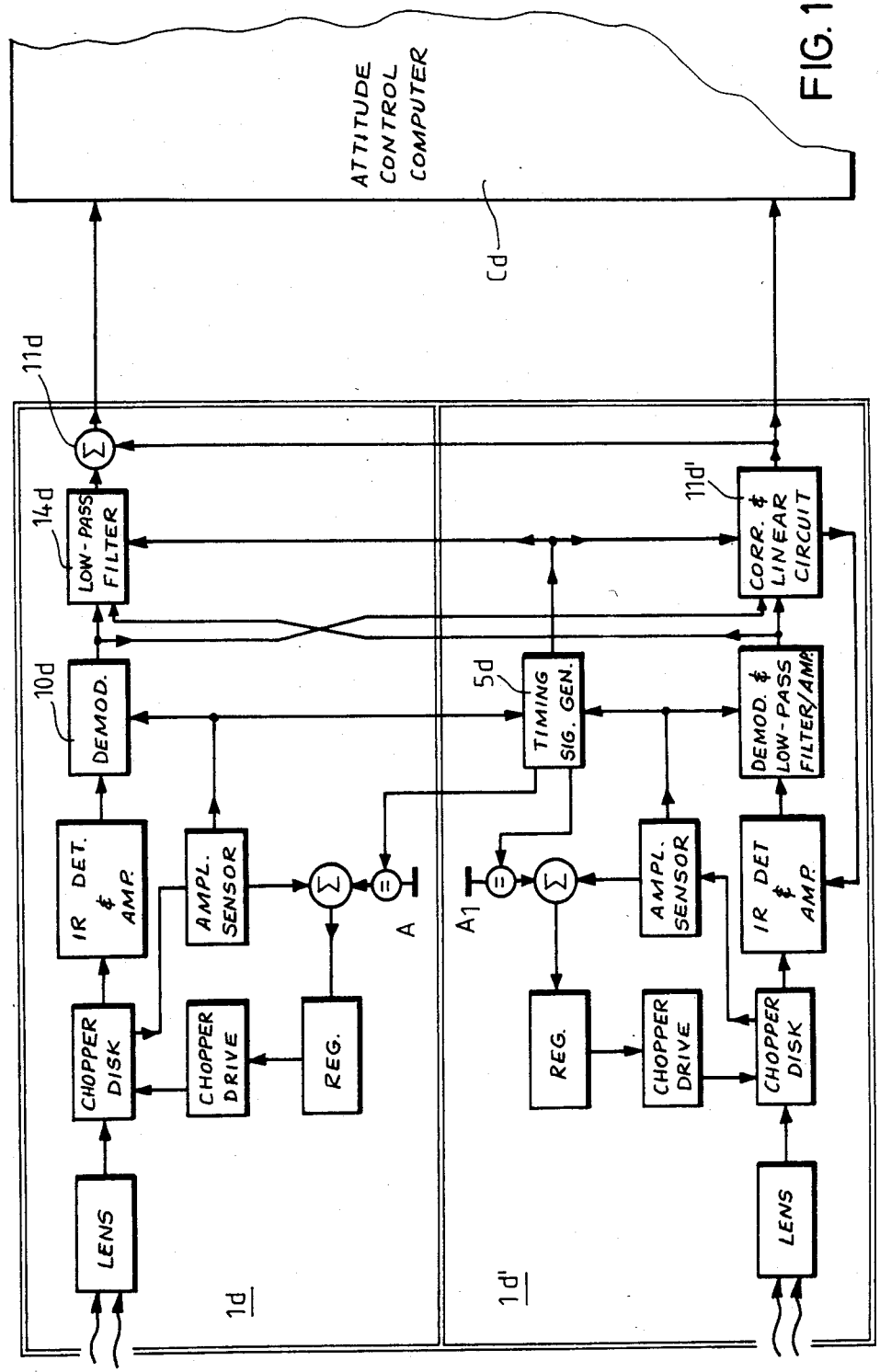

FIGS. 9 and 10 show circuit arrangements for anomaly correction which work in a double-channel manner in each instance, wherein the two earth sensors 1c and 1c' and 1d and 1d', respectively each change their amplitude in both cases. The substantial difference consists in that in the embodiment according to FIG. 9, the evaluation is effected externally in the computer Cc for the attitude control, but internal to the sensor in the embodiment according to FIG. 10.

The two channels 1c and 1c' in FIG. 9 are identically constructed and, like the sensor in FIG. 7, each comprises a lens 2c, 2c', a chopper disk 3c, 3c', a chopper drive 4c, 4c', a chopper amplitude sensor 6c, 6c', as well as a regulator 8c, 8c' for the chopper drive. The output signals of the two IR detectors 9c and 9c' are demodulated, in each instance, in a demodulators 10c and 10c', respectively, each having low-pass filter and amplifier. The off-course signals of the two channels are fed to the computer Cc for the attitude control and are there evaluated corresponding to the above descriptions.

The chopper amplitudes are changed in both channels. The amplitudes can be switched between two amplitude values A and A1, wherein the respective switching times intersect with the respective amplitudes. In this way, the off-course signal is always supplied by the steady-state sensor with the greatest chopper amplitude, while the other sensor channel with the smaller amplitude generates the signal needed for correcting the anomaly. The corrected off-course signal is available continuously because of this intersecting. The output signals of the two channels are compared for corresponding amplitudes; this comparison is used for aligning the characteristic lines, i.e. for the drift compensation.

In FIG. 10 the evaluation of the sensor output signals is effected internal to the sensor. A common timing pulse generator 5d is provided for the two channels 1d and 1d', which timing pulse generator 5d controls the circuit of the chopper amplitude and the evaluation for the two channels. The output signal of the demodulator 10d in the channel 1d is fed to a summing member 11b via a low-pass filter 14d. On the other hand, this summing member obtains from the second channel 1d' a correction signal determined in the correcting member 11b' for the anomaly so that the corrected off-course signal appears at the output of the summing member 11d. The anomaly signal is located at the output of the correcting and linearizing member 11d'. The two signals are fed to the computer Cd for the attitude control of the satellite. The correction circuit 11d' obtains the uncorrected off-course signal, as in the embodiment example according to FIG. 7, in each instance, from the demodulator 10d' with low-pass filter and amplifier of the second channel 1d', as well as from the demodulator 10d of the first channel 1d. The off-course signal, as well as the anomaly signal, can be continuously measured by means of this cross connection of the two channels.

What is claimed is:

1. A method for processing the output signals of an optical earth-horizon sensor of a geostationary satellite, wherein said earth-horizon sensor comprises an input lens, a chopper disk which is located in the image plane of said input lens and is reciprocated with a predetermined amplitude (chopper amplitude) and frequency (chopper frequency) and has a diameter corresponding approximately to the image of the earth, a secondary lens and a detector, the output signal of said earth-horizon sensor being amplified and demodulated to a standard sensor off-course signal with said chopper frequency, said sensor off-course signal being a measurement for the off-course angle of the line of sight of said earth-horizon sensor in relation to the satellite/earth central point connecting line, characterized in that in order to reduce the error of said sensor off-course signals produced by differently warm earth rims (anomaly), said method comprises operating said earth-horizon sensor with different chopper amplitudes, comparing the respective off-course signals for the chopper amplitudes with the values of the standard sensor off-course signals for chopper amplitudes without said anomaly in a common off-course angle; when the corresponding values for a common off-course angle do not coincide, determining the difference between the measured values and said standard off-course signal values, and correcting said measured values by the amounts of this difference (anomaly position), whereby said corrected measured values now coincide with said standard signal values.

2. Method according to claim 1, characterized in that for small angles, said off-course signals ($U_D$, $U_{D1}$) are measured for two different chopper amplitudes (A, A1), and the off-course signal ($U_D$) measured for the greater amplitude is reduced by the anomaly portion $$U_{DA} = \frac{A}{A - A_1} (U_D - U_{D1}),$$

and in corresponding off-course angle of said standard off-course signal is assigned to this corrected value.

3. Method according to claim 1, characterized in that said chopper amplitude modulates at a frequency above the bandwidth of said sensor off-course signal and the measured off-course signal is demodulated synchronously; in that the demodulated portion is compared with the values of said standard off-course signal; and in that said measured off-course signal is reduced by the amount of an error signal corresponding to said comparison.

* * * * *